US008881266B2

(12) United States Patent
Chow et al.

(10) Patent No.: US 8,881,266 B2
(45) Date of Patent: Nov. 4, 2014

(54) ENTERPRISE PASSWORD RESET

(75) Inventors: Richard Chow, Sunnyvale, CA (US);
Philippe J. P. Golle, San Francisco, CA (US); Bjorn Markus Jakobsson, Mountain View, CA (US); Jessica N. Staddon, Redwood City, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1051 days.

(21) Appl. No.: 12/270,159

(22) Filed: Nov. 13, 2008

(65) Prior Publication Data

US 2010/0122340 A1    May 13, 2010

(51) Int. Cl.
| G06F 21/31 | (2013.01) |
| G06F 17/30 | (2006.01) |
| G06F 21/46 | (2013.01) |
| H04L 29/06 | (2006.01) |
| G06F 7/02 | (2006.01) |

(52) U.S. Cl.
CPC ............... *G06F 21/31* (2013.01); *G06F 17/30* (2013.01); *G06F 21/46* (2013.01); *H04L 29/06795* (2013.01); *H04L 29/06782* (2013.01); *H04L 63/0846* (2013.01); *G06F 7/02* (2013.01)
USPC ....... 726/18; 726/6; 726/4; 713/168; 713/183

(58) Field of Classification Search
CPC .......... G06F 17/30; G06F 21/31; G06F 7/00; G06F 21/46; H04L 29/06782; H04L 29/06795; H04L 63/08462
USPC .............................. 726/18, 6, 4; 713/168, 183
See application file for complete search history.

(56) References Cited

U.S. PATENT DOCUMENTS

| 6,055,512 | A | * | 4/2000 | Dean et al. ...................... 705/17 |
| 6,249,405 | B1 | * | 6/2001 | Hoshiya et al. ............. 360/324.1 |
| 6,332,139 | B1 | * | 12/2001 | Kaneko et al. ........................ 1/1 |
| 6,564,047 | B1 | * | 5/2003 | Steele et al. .................. 455/405 |
| 6,697,806 | B1 | * | 2/2004 | Cook .................................... 1/1 |
| 6,925,443 | B1 | * | 8/2005 | Baggett et al. ............... 705/7.32 |
| 7,085,555 | B2 | * | 8/2006 | Zellner et al. .............. 455/414.1 |
| 7,133,515 | B1 | * | 11/2006 | Cook ....................... 379/208.01 |
| 7,289,794 | B2 | * | 10/2007 | Bowne et al. .............. 455/414.1 |
| 7,340,438 | B2 | * | 3/2008 | Nordman et al. ............... 705/64 |
| 7,373,509 | B2 | * | 5/2008 | Aissi et al. ..................... 713/168 |
| 7,433,829 | B2 | * | 10/2008 | Borgia et al. ................ 705/7.13 |
| 7,469,340 | B2 | * | 12/2008 | Karamchedu et al. ........ 713/172 |

(Continued)

OTHER PUBLICATIONS

Rabkin, "Personal knowledge questions for fallback authentication: Security questions in the era of Facebook", 2008.*

(Continued)

*Primary Examiner* — O. C. Vostal
(74) *Attorney, Agent, or Firm* — Shun Yao; Park, Vaughan, Fleming & Dowler LLP

(57) ABSTRACT

One embodiment of the present invention provides a system for automatically authenticating a user. During operation, the system receives a user's request for authentication. The system then extracts information associated with the user from user-specific information stored in an enterprise computer. The extracted user information does not explicitly relate to a password. The system further generates one or more challenges based on the extracted user information, and receives the user's response to the challenges. Subsequently, the system compares the user's response to the extracted user information, and authenticates the user.

24 Claims, 3 Drawing Sheets

(56) References Cited

U.S. PATENT DOCUMENTS

| | | | |
|---|---|---|---|
| 7,472,423 B2* | 12/2008 | DeCenzo et al. | 726/26 |
| 7,523,486 B1* | 4/2009 | Turner | 726/2 |
| 7,546,276 B2* | 6/2009 | Randle et al. | 705/65 |
| 7,729,532 B2* | 6/2010 | Tedesco et al. | 382/159 |
| 7,853,581 B2* | 12/2010 | Riedl et al. | 707/706 |
| 7,874,011 B2* | 1/2011 | Boss et al. | 726/28 |
| 7,877,791 B2* | 1/2011 | Childress et al. | 726/5 |
| 7,975,292 B2* | 7/2011 | Corella | 726/6 |
| 7,986,816 B1* | 7/2011 | Hoanca et al. | 382/115 |
| 8,131,718 B2* | 3/2012 | Tran | 707/732 |
| 8,359,278 B2* | 1/2013 | Domenikos et al. | 705/325 |
| 8,385,824 B2* | 2/2013 | Bakshi et al. | 455/41.2 |
| 8,572,372 B2* | 10/2013 | Varriale et al. | 713/165 |
| 2002/0040374 A1* | 4/2002 | Kent | 707/516 |
| 2002/0059202 A1* | 5/2002 | Hadzikadic et al. | 707/3 |
| 2002/0099942 A1* | 7/2002 | Gohl | 713/169 |
| 2002/0147766 A1* | 10/2002 | Vanska et al. | 709/203 |
| 2002/0165986 A1* | 11/2002 | Tarnoff | 709/246 |
| 2002/0169865 A1* | 11/2002 | Tarnoff | 709/223 |
| 2002/0174073 A1* | 11/2002 | Nordman et al. | 705/64 |
| 2003/0028451 A1* | 2/2003 | Ananian | 705/27 |
| 2003/0128099 A1* | 7/2003 | Cockerham | 340/5.7 |
| 2003/0139174 A1* | 7/2003 | Rao | 455/418 |
| 2003/0191682 A1* | 10/2003 | Shepard et al. | 705/10 |
| 2003/0229900 A1* | 12/2003 | Reisman | 725/87 |
| 2004/0128183 A1* | 7/2004 | Challey et al. | 705/10 |
| 2004/0140885 A1* | 7/2004 | Slicker et al. | 340/426.1 |
| 2004/0168069 A1* | 8/2004 | Knight | 713/186 |
| 2004/0187029 A1* | 9/2004 | Ting | 713/201 |
| 2004/0255140 A1* | 12/2004 | Margolus et al. | 713/193 |
| 2005/0005113 A1* | 1/2005 | Dillon et al. | 713/168 |
| 2005/0027713 A1* | 2/2005 | Cameron et al. | 707/100 |
| 2005/0039005 A1* | 2/2005 | Dyck et al. | 713/168 |
| 2005/0071643 A1* | 3/2005 | Moghe | 713/182 |
| 2005/0114527 A1* | 5/2005 | Hankey et al. | 709/228 |
| 2005/0114705 A1* | 5/2005 | Reshef et al. | 713/201 |
| 2005/0207560 A1* | 9/2005 | Speight | 379/266.07 |
| 2005/0246434 A1* | 11/2005 | Bantz et al. | 709/223 |
| 2005/0261062 A1* | 11/2005 | Lewin et al. | 463/42 |
| 2005/0288961 A1* | 12/2005 | Tabrizi | 705/1 |
| 2005/0289650 A1* | 12/2005 | Kalogridis | 726/22 |
| 2006/0010203 A1* | 1/2006 | Mrsic-Flogel et al. | 709/205 |
| 2006/0036868 A1* | 2/2006 | Cicchitto | 713/182 |
| 2006/0048190 A1* | 3/2006 | Aoki et al. | 725/46 |
| 2006/0095508 A1* | 5/2006 | Itabashi et al. | 709/203 |
| 2006/0105784 A1* | 5/2006 | Zellner et al. | 455/456.3 |
| 2006/0230461 A1* | 10/2006 | Hauser | 726/27 |
| 2006/0282660 A1* | 12/2006 | Varghese et al. | 713/155 |
| 2006/0288425 A1* | 12/2006 | Redlich et al. | 726/26 |
| 2007/0016488 A1* | 1/2007 | Ulenas | 705/26 |
| 2007/0156677 A1* | 7/2007 | Szabo | 707/5 |
| 2007/0179846 A1* | 8/2007 | Jain et al. | 705/14 |
| 2007/0186103 A1* | 8/2007 | Randle et al. | 713/168 |
| 2007/0220575 A1* | 9/2007 | Cooper et al. | 725/118 |
| 2007/0232271 A1* | 10/2007 | Dyck et al. | 455/411 |
| 2007/0250920 A1* | 10/2007 | Lindsay | 726/7 |
| 2007/0266031 A1* | 11/2007 | Adams et al. | 707/10 |
| 2007/0266258 A1* | 11/2007 | Brown et al. | 713/183 |
| 2007/0288613 A1* | 12/2007 | Sudame et al. | 709/223 |
| 2008/0066165 A1* | 3/2008 | Rosenoer | 726/5 |
| 2008/0071619 A1* | 3/2008 | Charlton et al. | 705/14 |
| 2008/0120508 A1* | 5/2008 | Marconi et al. | 713/184 |
| 2008/0133364 A1* | 6/2008 | Ullah | 705/14 |
| 2008/0140577 A1* | 6/2008 | Rahman et al. | 705/71 |
| 2008/0140786 A1* | 6/2008 | Tran | 709/206 |
| 2008/0141337 A1* | 6/2008 | Yeung et al. | 726/1 |
| 2008/0168540 A1* | 7/2008 | Agarwal et al. | 726/5 |
| 2008/0200168 A1* | 8/2008 | Jiang | 455/432.1 |
| 2008/0222734 A1* | 9/2008 | Redlich et al. | 726/26 |
| 2008/0229422 A1* | 9/2008 | Hudis et al. | 726/25 |
| 2008/0242279 A1* | 10/2008 | Ramer et al. | 455/414.2 |
| 2008/0262863 A1* | 10/2008 | Stickley et al. | 705/1 |
| 2008/0263652 A1* | 10/2008 | McMurtry et al. | 726/9 |
| 2009/0089869 A1* | 4/2009 | Varghese | 726/7 |
| 2009/0100047 A1* | 4/2009 | Jones et al. | 707/5 |
| 2009/0150677 A1* | 6/2009 | Vedula et al. | 713/183 |
| 2009/0150989 A1* | 6/2009 | Hoey et al. | 726/10 |
| 2009/0158406 A1* | 6/2009 | Jancula et al. | 726/5 |
| 2009/0177323 A1* | 7/2009 | Ziegler et al. | 700/259 |
| 2009/0228583 A1* | 9/2009 | Pocklington et al. | 709/224 |
| 2009/0249477 A1* | 10/2009 | Punera | 726/18 |
| 2009/0319482 A1* | 12/2009 | Norlander et al. | 707/3 |
| 2009/0320107 A1* | 12/2009 | Corella | 726/6 |
| 2010/0004004 A1* | 1/2010 | Browne-Swinburne et al. | 455/457 |
| 2010/0024037 A1* | 1/2010 | Grzymala-Busse et al. | 726/26 |
| 2010/0030905 A1* | 2/2010 | Fikouras et al. | 709/228 |
| 2010/0037047 A1* | 2/2010 | Varriale et al. | 713/165 |
| 2010/0106503 A1* | 4/2010 | Farrell et al. | 704/246 |
| 2010/0122316 A1* | 5/2010 | Lyon | 726/1 |
| 2010/0146263 A1* | 6/2010 | Das et al. | 713/155 |

OTHER PUBLICATIONS

M. Jakobsson, L. Yang, and S. Wetzel. "Quantifying the Security of Preference-Based Authentication." DIM '08.

M. Jakobsson, E. Stolterman, S. Wetzel, and L. Yaang "Love and Authentication", In Proceedings of ACM Human/Computer Interaction Conf. (CHI), 2008.

* cited by examiner

ENTERPRISE PASSWORD RESET

BACKGROUND

1. Field of the Invention

The present disclosure relates to user password resetting. More specifically, the present disclosure relates to automated user password resetting in an enterprise environment.

2. Related Art

In today's enterprise, each employee is often assigned a user account for emails and file storage space access. In addition, certain enterprise documents may only be viewed by authorized users. To protect enterprise information from ill-intended intruders and to ensure proper information sharing, user accounts and enterprise documents are password protected. Once in a while, an employee may forget his password and request his password to be reset. Traditionally, such an action is often accomplished by telephoning or visiting in person the enterprise's information help desk, during which a help desk clerk verifies the user's identity and resets his password.

Note that password resetting is one of the most common tasks faced by an enterprise information help desk. Statistics have shown that password resetting accounts for about one in four help desk requests. The human involvement in the password-resetting process is costly to an enterprise. Thus, it is desirable to have an automated way to authenticate a user for the purpose of password resetting in an enterprise environment.

SUMMARY

One embodiment of the present invention provides a system for automatically authenticating a user. During operation, the system receives a user's request for authentication. The system then extracts information associated with the user from user-specific information stored in an enterprise computer. The extracted user information does not explicitly relate to a password. The system further generates one or more challenges based on the extracted user information, and receives the user's response to the challenges. Subsequently, the system compares the user's response to the extracted user information, and authenticates the user.

In a variation on this embodiment, the user is authenticated without inputting a password.

In a variation on this embodiment, the system identifies a risk indication.

In a variation on this embodiment, the system subsequently resets a password of the authenticated user.

In a variation on this embodiment, the user-specific information includes one or more of: the user's calendar entries, the user's file usage history, the user's email, the user's contact list, and the user's past activity.

In a variation on this embodiment, the system presents the challenges to the user using a web-based application.

In a variation on this embodiment, the user response is generated by humans.

In a variation on this embodiment, the user response is generated by a proxy for the user.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, application-specific integrated circuits (ASICs), field-programmable gate arrays (FPGAs), magnetic and optical storage devices such as disk drives, magnetic tape, CDs (compact discs), DVDs (digital versatile discs or digital video discs), or other media capable of storing computer-readable media now known or later developed.

Overview

Embodiments of the present invention provide a method for verifying an enterprise user's identity. During operation, an enterprise server automatically generates security questions based on user-specific information, such as documents, emails, and calendar entries, associated with the user. As a result, the user can verify his identity and reset his password without human IT support.

Automated Password Resetting

Figure 1:
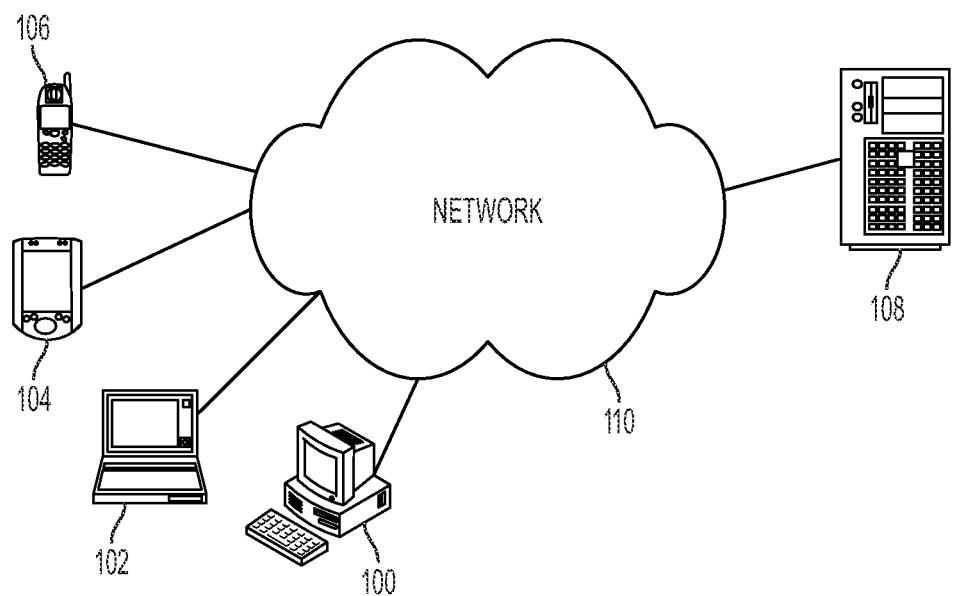
FIG. 1 illustrates an exemplary network for enterprise user password resetting in accordance with one embodiment of the present invention.

FIG. 1 illustrates an exemplary network for enterprise password resetting in accordance with one embodiment of the present invention. In FIG. 1, a user's computer device, which can be a desktop computer 100, a laptop computer 102, a personal digital assistant (PDA) 104, or, a smart phone 106, couples to an enterprise server 108 via network 110. Network 110 can be an enterprise intranet, or a virtual private network (VPN), or the Internet. During daily operation, an enterprise user may store user-specific information remotely on enterprise server 108 which assigns each user data storage space, or locally on the user's enterprise computer devices, such as desktop computer 100, laptop computer 102, PDA 104, and smart phone 106. Either way, the enterprise server typically has access to such user-specific information, which can include documents, emails, contact information, calendar entries, etc.

Because user-specific information often contains information only known to the user, such as his email content, enterprise server 108 can mine such user-specific information to generate a set of questions (challenges) based on the extracted information to verify the user's identity. Being able to authenticate a user based on extracted user information provides added protection to the conventional password-protected system. For example, when enterprise server 108 detects a risk factor, such as number of login attempts exceeds a predetermined number or the user is logging in from an unknown IP address, server 108 can use extracted user information to authenticate the user on top of asking the user to provide his password. In addition, server 108 can use extracted user information to authenticate a user who requests resetting his password.

In one embodiment of the present invention, once a user requests password resetting, the enterprise server accesses user-specific information stored on the server as well as on his local computer devices. Examples of user-specific information include the user's email, the user's calendar entries recording the user's meeting times, the user's contact list, and the user's work documents. In one embodiment, user-specific information stored on the enterprise server also includes files that contain a user's background information, such as his date of birth (DOB) and Social Security Number (SSN).

While mining the user-specific information, the server extracts information associated with the user, such as the user behavior information, and generates a set of questions based on extracted user information. Note that because it is the server (which is a machine) and not the help desk clerk that mines the user-specific information, the user's privacy is not compromised. Note that password related information, such as a backup password or answers to security questions, are often encrypted and in general not extractable. The question can be formulated in a way that little information is revealed by the question itself.

In one embodiment of the present invention, the enterprise server accesses the user's calendar to obtain information regarding a user's upcoming appointment and generates questions based on the appointment information. For example, the user's calendar marks a weekly meeting at 11:00 AM each Tuesday. Accordingly, the server may ask a question like "At what time do you have a weekly recurring meeting on Tuesday?" In a further embodiment of the present invention, the server obtains time stamps of computer work files, such as word-processing documents, and generates a question like "Name a file you have recently worked on."

In one embodiment, the server monitors the user's web-browsing activity to obtain user information. For example, before requesting to reset his password, a user has searched for and bought tickets for a trip to a Caribbean island. The server may generate a question like "On your next vacation, do you want to go skiing, fishing in the mountains, or to the beach?"

After generating questions that can only be answered by the legitimate user of an account, the server presents the questions to the user, and by comparing the user's input to user information previously extracted by the server, the server can verify the user's identity. If the user's answer matches the extracted user information, the server determines that the user is legitimate and resets the user's password as requested. If the user's answer does not match the extracted user information, the server indicates information mismatch. In one embodiment, the server allows a user a predetermined number of attempts to input the correct answer before finally rejecting the user's password resetting request.

Automatic enterprise password resetting can be implemented using different techniques. In one embodiment, a user accesses a web-based application, which runs on an enterprise server, to request password resetting. The web-based application accesses the user's Microsoft™ Exchange account to obtain information from the user's email, calendar, contact list, etc. Based on obtained user information, the web-based application generates and presents a set of questions for the user to answer. By comparing the user's input with obtained user information, the web-based application authenticates the user and resets the user's password.

Figure 2:
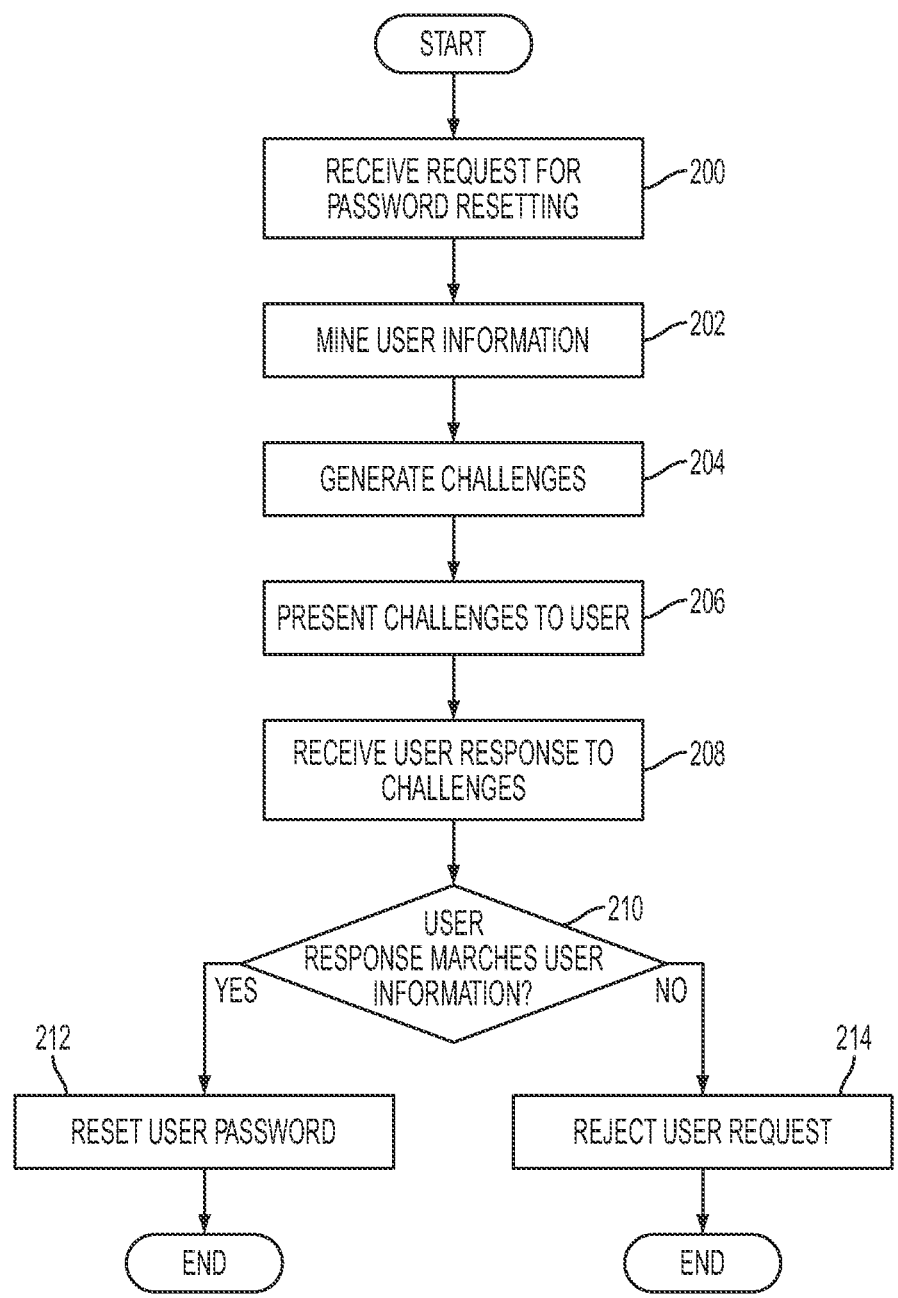
FIG. 2 presents a flow chart illustrating the process of enterprise user password resetting in accordance with one embodiment of the present invention.

FIG. 2 presents an exemplary flow chart illustrating the process of user password resetting in accordance with one embodiment of the present invention. During operation (operation 200), the enterprise server receives a user's request for password resetting. Next, the enterprise server extracts information associated with the user from the user-specific information stored in an enterprise computer (operation 202). The enterprise server then generates challenges based on the extracted user information (operation 204). Subsequently, the enterprise server presents the challenges to the user (operation 206). In response, the enterprise server receives the user's response to the challenges (operation 208). The enterprise server then compares the user's response to the extracted user information (operation 210). If the user's response matches the extracted user information, the enterprise server resets the user's password (operation 212). Otherwise, the enterprise server determines if the user has tried for a predetermined number of times (operation 214). If not, the server allows the user to input his response again (operation 208). If so, the server rejects the user's password-resetting request (operation 216).

In addition to act as an added security feature in a password-protected system, extracted user information can also replace a conventional password. In one embodiment of the present invention, the enterprise server no longer asks a user to input a password, instead, the server authenticates the user using extracted user information each time the user attempts to access his account.

Figure 3:
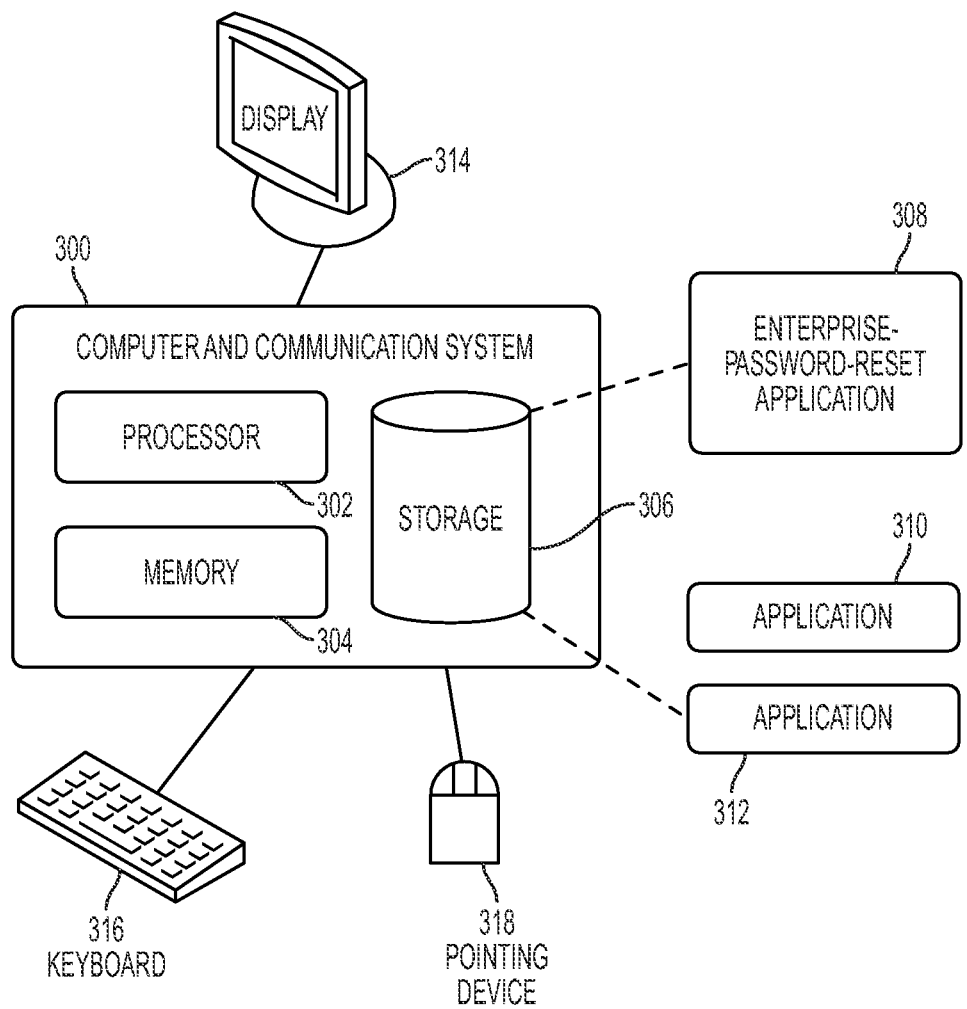
FIG. 3 illustrates an exemplary computer system for enterprise user password resetting in accordance with one embodiment of the present invention.

FIG. 3 illustrates an exemplary computer system for enterprise password resetting in accordance with one embodiment of the present invention. In one embodiment, a computer and communication system 300 includes a processor 302, a memory 304, and a storage device 306. Storage device 306 stores an enterprise-password-reset application 308, as well as other applications, such as applications 310 and 312. In one embodiment, enterprise-password-reset application 308 further includes a program that facilitates the identification of user information and the generation of security questions. During operation, enterprise-password-reset application 308 is loaded from storage device 306 into memory 304 and then executed by processor 302. While executing the program, processor 302 performs the aforementioned functions. Computer and communication system 300 is also coupled to an optional display 314, keyboard 316, and pointing device 318. Display 314, keyboard 316, and pointing device 318 can facilitate enterprise user password resetting.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A computer-executed method for authenticating a user, the method comprising:

receiving a request from the user for authentication;

extracting, by a server computer, user-behavior information associated with the user from user-specific information stored in an enterprise computer, wherein the extracted user-behavior information includes one or more temporal activities associated with the user, and wherein the user-behavior information is extracted by the server computer so that the user's privacy is not compromised by a clerk of an enterprise information help-desk;

generating one or more challenges based on the extracted user-behavior information for the user, wherein generating a respective challenge involves:
  selecting a behavior-information item from the extracted user-behavior information;
  generating a question so that the selected behavior-information item is the answer to the question, wherein the question is formulated in a way that the question does not reveal the selected behavior-information item; and
  formulating the respective challenge using the generated question;
receiving respective responses from the user to the challenges;
comparing the user's responses to the behavior-information items used to formulate the corresponding challenges; and
authenticating the user using the challenges without asking the user to input a password.

2. The method of claim 1, further comprising identifying a risk indication.

3. The method of claim 1, further comprising subsequently resetting a password of the authenticated user.

4. The method of claim 1, wherein the user-specific information includes one or more of:
  calendar entries of the user;
  file usage history of the user;
  emails of the user;
  web browsing history of the user;
  contact list of the user; and
  past activities of the user.

5. The method of claim 1, further comprising presenting the challenges to the user using a web-based application.

6. The method of claim 1, wherein the user response is generated by a human.

7. The method of claim 1, wherein the user response is generated by a proxy for the user.

8. The method of claim 1, further comprising generating the challenges based on temporal information associated with computer work files of the user, wherein the temporal information is extracted from time stamps of the work files.

9. A non-transitory computer-readable storage medium storing instructions which when executed by a computer cause the computer to perform a method for authenticating a user, the method comprising:
  receiving a request from the user for authentication;
  extracting user-behavior information associated with the user from user-specific information stored in an enterprise computer, wherein the extracted user-behavior information includes one or more temporal activities associated with the user, and wherein the user-behavior information is extracted by a server computer so that the user's privacy is not compromised by a clerk of an enterprise information help-desk;
  generating one or more challenges based on the extracted user-behavior information for the user, wherein generating a respective challenge involves:
    selecting a behavior-information item from the extracted user-behavior information;
    generating a question so that the selected behavior-information item is the answer to the question, wherein the question is formulated in a way that the question does not reveal the selected behavior-information item; and
    formulating the respective challenge using the generated question;
  receiving respective responses from the user to the challenges;
  comparing the user's responses to the behavior-information items used to formulate the corresponding challenges; and
  authenticating the user using the challenges without asking the user to input a password.

10. The computer-readable storage medium of claim 9, wherein the method further comprises identifying a risk indication.

11. The computer-readable storage medium of claim 9, wherein the method further comprises subsequently resetting a password of the authenticated user.

12. The computer-readable storage medium of claim 9, wherein the user-specific information includes one or more of:
  calendar entries of the user;
  file usage history of the user;
  emails of the user;
  web browsing history of the user;
  contact list of the user; and
  past activities of the user.

13. The computer-readable storage medium of claim 9, wherein the method further comprises presenting the challenges to the user using a web-based application.

14. The computer-readable storage medium of claim 9, wherein the user response is generated by a human.

15. The computer-readable storage medium of claim 9, wherein the user response is generated by a proxy for the user.

16. The computer-readable storage medium of claim 9, wherein the method further comprises generating the challenges based on temporal information associated with computer work files of the user, wherein the temporal information is extracted from time stamps of the work files.

17. A computer system for authenticating a user, comprising:
  a processor;
  a memory;
  a receiving mechanism configured to receive a request from the user for authentication;
  an extracting mechanism configured to extract user-behavior information associated with the user from user-specific information stored in an enterprise computer, wherein the extracted user-behavior information includes one or more temporal activities associated with the user, and wherein the user-behavior information is extracted by the computer system so that the user's privacy is not compromised by a clerk of an enterprise information help-desk;
  a formulating mechanism configured to:
    select a behavior-information item from the extracted user-behavior information; and
    generate a question so that the selected behavior-information item is the answer to the question, wherein the question is formulated in a way that the question does not reveal the selected behavior-information item;
  a generating mechanism configured to generate one or more challenges using the generated questions;
  a receiving mechanism configured to receive respective responses from the user to the challenges;
  a comparing mechanism configured to compare the user's responses to the behavior-information items used to formulate the corresponding challenges; and
  an authenticating mechanism configured to authenticate the user using the challenges without asking the user to input a password.

18. The computer system of claim 17, further comprising an identifying mechanism configured to identify a risk indication.

19. The computer system of claim 17, further comprising a password resetting mechanism configured to subsequently reset a password of the authenticated user.

20. The computer system of claim 17, wherein the user-specific information includes one or more of:
- calendar entries of the user;
- file usage history of the user;
- emails of the user;
- web browsing history of the user;
- contact list of the user; and
- past activities of the user.

21. The computer system of claim 17, further comprising a presenting mechanism configured to present the challenges to the user using a web-based application.

22. The computer system of claim 17, wherein the user response is generated by a human.

23. The computer system of claim 17, wherein the user response is generated by a proxy for the user.

24. The computer system of claim 17, wherein the challenges are generated based on temporal information associated with computer work files of the user, wherein the temporal information is extracted from time stamps of the work files.

\* \* \* \* \*